Nov. 14, 1967     B. A. KRUCE     3,352,733
METHOD AND APPARATUS FOR MAKING A CARPET UNIT
Filed Sept. 29, 1965     2 Sheets-Sheet 1
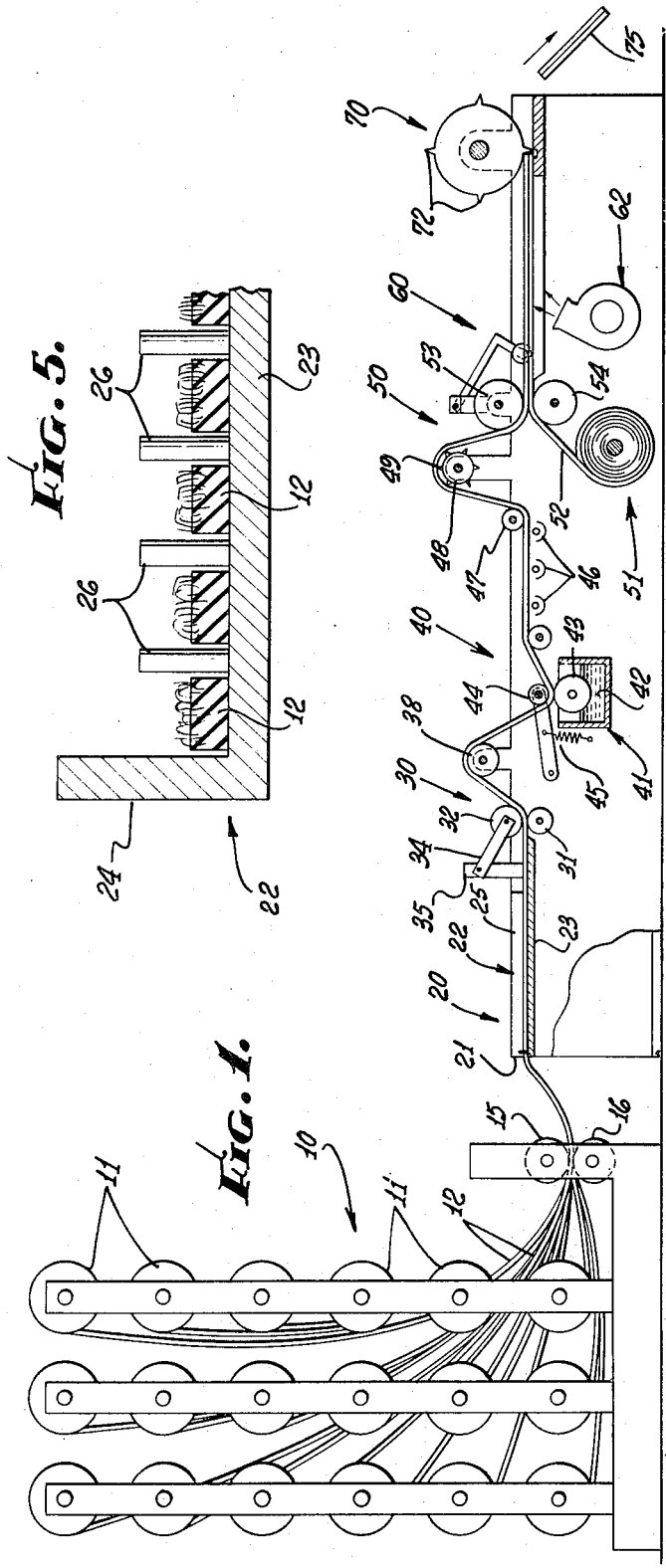
INVENTOR.
BENJAMIN A. KRUCE
By Miketta, Glenny, Poms & Smith
ATTORNEYS.

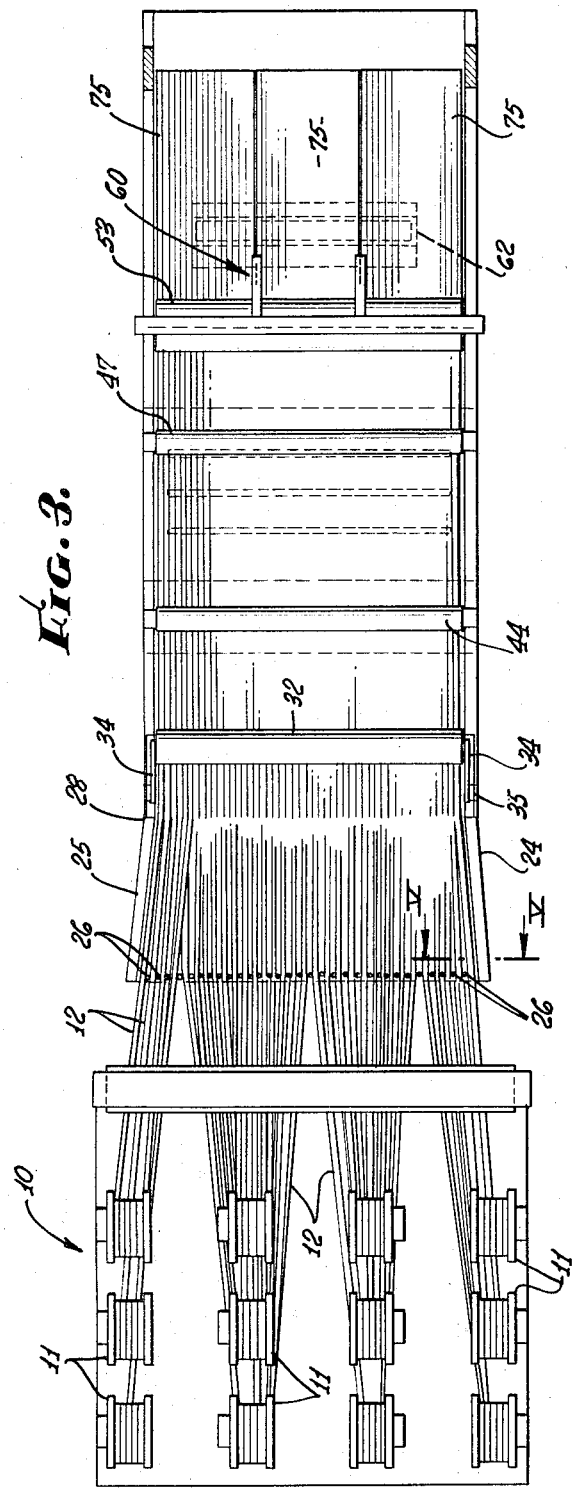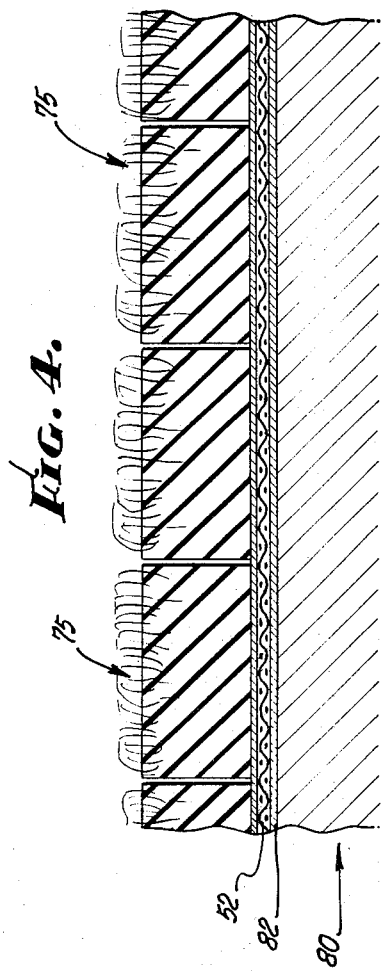
INVENTOR.
BENJAMIN A. KRUCE

United States Patent Office 3,352,733
Patented Nov. 14, 1967

3,352,733
METHOD AND APPARATUS FOR MAKING
A CARPET UNIT
Benjamin A. Kruce, 1833 Midvale Drive,
Pomona, Calif. 91766
Filed Sept. 29, 1965, Ser. No. 491,346
3 Claims. (Cl. 156—94)

This invention relates generally to carpeting in the form of carpet strips or tile, and to the mounting thereof on a floor made of material such as concrete subject to breathing or sweating over an extended period, as well as to apparatus and method for manufacture of such carpet from salvage material having little economic value.

As is well known, conventional tire casings for vehicles are made of rubber or a rubber substitute such as synthetic rubber, and include cords embedded therein made of filamentary material. Such cords in some instances may be cotton or other textile fabric, or they may be of nylon, rayon or other synthetic materials, the latter being virtually non-hygroscopic and preferable in the present invention.

In accordance with the present invention, a plurality of narrow, elongated elements are cut circularly or spirally from the casing of a vehicle tire, an outer portion of the rubber matrix of the element is removed, as by abrading, (as taught, for example in the Lea Patent Re. 24,937), in order to leave exposed a portion of the cords extending upwardly from the rubbery elements to form a carpet pile. A plurality of such elements are then assembled in parallel side-by-side relation and their bottom surfaces are permanently laminated or affixed by suitable adhesive means to a backing sheet, desirably woven or non-hygroscopic material such as fiberglass. The material thus assembled may then be longitudinally sliced or transversely cut to form carpet units of desired size and shape. This process in accordance with the present invention is desirably carried out in a continuous manner, whereby to achieve substantial economies in cost over prior methods proposed for fabrication of carpet units such as in the Lea Patent Re. 24,937. Furthermore, the continuous process in accordance with the present invention affords more accurate control of the process, whereby to insure virtually constant high quality of the product.

The product itself in accordance with the present invention may be advantageously mounted upon floors, steps or the like of any conventional structural material. A particular advantage of the carpet units of the present invention results when such units are mounted, by permeable adhesive means, on a floor or other supporting surface made of concrete. As is well known, concrete is characterized by breathing or sweating, particularly during its period of active curing, but continuing to some degree over an extended period, virtually over the entire useful life of the concrete. If such breathing is substantially inhibited, as by a layer of carpet or the like, the strength and useful life of the concrete may be adversely affected. The carpet units of the present invention are so constructed, and are so applied to a concrete floor or other supporting surface, as to minimize interference with concrete breathing or sweating. Thus the woven fiberglass backing sheet provides a multiplicity of air pockets, and the adhesive by which the carpet units are affixed to a floor is permeable to flow of air and water vapor therethrough. For example, liquid neoprene adhesive including a decomposition agent such as ammoniated carbonate may be used.

The foregoing advantageous characteristics of the present invention become particularly apparent when the tile in accordance with the present invention is used in adverse weather conditions, such as in environments of wide changes of temperature, substantial moisture in the form of rain, snow and the like and heavy wear by foot traffic.

Accordingly, it is a principal object of the present invention to provide and disclose a novel method or process of manufacture of carpet units made of reclaimed portions of automobile tires, and to provide and disclose the novel product so made and its adhesive bonding to a surface such as concrete which sweats over an extended period. Other objects and purposes are to disclose a continuous method of manufacture of the product mentioned, whereby to achieve not only economy of cost but also close and accurate control of quality; to provide a method of manufacture of such carpet material which readily permits incorporation of one or more cutting steps following the actual formation of the carpet, whereby to produce carpet units having a desired size and shape for modular laying on supporting surfaces; to disclose a carpet tile particularly fashioned to minimize interference with the normal breathing of concrete or similar supporting surface on which the carpet is mounted; and for other and additional objects and purposes as will be understood from the following description of the preferred embodiment of the invention, taken in connection with the accompanying drawings, in which:

FIG. 1 is a diagrammatic showing of the process of making carpet in accordance with the invention.

FIG. 2 is a perspective view of a tile so made.

FIG. 3 is a plan view of the showing of FIG. 1.

FIG. 4 is a fragmentary sectional view on an enlarged scale of a carpet tile adhesively mounted on a concrete surface.

FIG. 5 is a fragmentary sectional view taken on arrows V—V of FIG. 3.

FIG. 6 is a fragmentary perspective view of abutting pieces of an element showing one form of fastening means retaining the pieces in abutting relation.

Referring now in detail to the drawings, there is shown in FIG. 1 an illustrative embodiment of the method of fabrication in accordance with the present invention, whereby narrow, elongated elements of rubbery material having threads projecting upwardly therefrom are assembled in parallel side-by-side relation, the lower surfaces of such elements are coated with an adhesive, the coated elements are heated and are then tightly bonded to a backing sheet of woven fiberglass. As part of the process in the continuous flow of material, the resulting wide strip may be sliced into narrower strips of desired widths, and the strips may be cut into desired lengths to form individual carpet units.

Thus the process shown in FIG. 1 contemplates continuously supplying from a source indicated generally at 10 a plurality of narrow, elongated elements, each element having a rubbery base, the upper face of the base having been abraded to expose the upper ends of cords embedded therein, aligning and orienting such elements in adjacent, side-by-side parallel relation in the zone indicated generally at 20, gripping the elements between vertically aligned rollers, as indicated generally at 30, whereby the elements may be placed under longitudinal tension in succeeding steps of the process, applying a coating of adhesive to the bottoms of the aligned and tensioned elements and subsequently heating the elements, as indicated generally at 40, bonding the coated and heated elements to a backing sheet of fiberglass under pressure, as indicated generally at 50, then longitudinally slicing and cooling the thus formed strips, as indicated generally at 60. and thereafter cutting the strips transversely as desired, for example into modular rectangular, preferably square, shape to form finished carpet units, as indicated generally at 70. Desirably a single sorce of power is used to move the elements through the process, rotational power being supplied to the pressure rollers at 50, as will be later understood.

More specifically, it will be assumed for purposes of explanation that the narrow, elongated elements are nominally one-half inch wide, with the rubbery body or base thereof being somewhat less than the dimension in depth, say ¼" to ⅜", and the threads embedded therein projecting upwardly from the base to form the carpet pile. The illustrative embodiment of the invention further contemplates the formation of a major strip 36 inches wide, to be sliced into three narrower strips, each one foot wide and including 22 of the narrow elongated elements, there being of necessity some lateral spacing between adjacent elements. Thus, source 10 may include a battery of 66 supply reels 11, each supplying a continuous narrow elongated element 12 of the construction and characteristics previously described. It may be noted that the elongated elements are made up of a succession of integral pieces cut circularly or spirally from a tire casing, each such piece having a length of at least four or five feet to as much as twenty feet or more when the piece is cut spirally from a tire casing. Successive pieces forming each element are held in end-to-end abutting relation by suitable fastening means such as staples 14 (see FIG. 6), the staples being removed from the finished carpet units after the fabrication process is completed.

The lements 12 coming from reels 11 are first substantially collimated and arranged in upright orientation, with the exposed cords extending upwardly from the base portions of the elements. Thus the elements may be led between vertically aligned rollers 15 and 16, so spaced as to exert a slight drag on the elements passing therebetween. Processing of the elements in the zone 20 contemplates further collimation of the elements while maintaining the elements in upright orientation. Thus the elements may extend upwardly from their exit from rollers 15 and 16 to the entrance end 21 of a table indicated generally at 22 having a flat bed 23 bounded laterally by upstanding side walls 24 and 25. At the entrance end 21 the entering elements 12 are oriented by suitable means to correct any possible twist along their lengths. Thus the entrance end 21 may be provided with a series of aligned laterally spaced upstanding pins 26 extending upwardly from the table bed 23. As seen in FIG. 5, successive pins are spaced from one another (and end pins are spaced from side walls 24 and 25) by a distance which is slightly greater than the width of one of the elements 12 but which is less than a diagonal of an element as seen in section, thereby preventing canting of the elements, while permitting them to slide freely onto the table.

The thus oriented and partially collimated elements are further collimated and gradually moved laterally into substantial juxtaposition during their longitudinal sliding movement on the table 22 from the entrance end thereof. Thus, as seen in FIG. 3, table side walls 24 and 25 are slightly convergent from entrance end 21 toward the other end of the table, narrowing to a width at 28 which maintains the elements in close side-by-side relation.

The thus oriented and juxtaposed elements, which are desirably already under some longitudinal tension by reason of the drag imposed by rollers 15 and 16, now pass between vertically aligned rollers 31 and 32, being comparatively tightly gripped therebetween in order to permit the elements to be under substantially greater longitudinal tension during their following treatment in accordance with the invention. Thus the upper roller 32 may be rotatably carried on a pair of arms 34 which are in turn pivotally connected to supports 35 fixed to table 22.

The elements 12 may then pass over a idler roller 38 and thence downwardly to the adhesive applying section 40. Thus, a tank indicated generally at 41 contains a quantity 42 of adhesive in liquid form, such as liquid neoprene, and a roller 43 is mounted for rotation in the tank, partially submerged in the adhesive 42. A backing roller 44 above roller 43 serves to force the bottoms of the elements 12 into contact with the roller 43, thereby coating the bottoms with the adhesive 42. Backing roller 44 may be urged downwardly by suitable means 45, preferably adjustably tensioned to facilitate initial threading of the elements.

The thus coated elements are heated from below by suitable means such as laterally extending electric heating units 46. The elements may then be led via roller 47 to roller 48, the latter being laterally serrated whereby to contact the adhesive coated element bottoms only along narrow transverse tips 49. The elements are then bonded at 50 onto the fiberglass backing sheet in accordance with the invention.

Thus, a roll of woven fiberglass sheet is indicated generally at 51, the sheet 52 having a width at least that of the major carpet strip to be fabricated, in the present instance 36 inches. The sheet 52 is fed upwardly and its upper surface is adhesively bonded to the bottoms of the elongated elements by passing between the vertically aligned compression rollers 53 and 54, thus forming a major carpet strip 36 inches wide. Pretreatment of the fiberglass, as with isocyanate, is desirable to insure proper bonding. For convenience in use of the carpet units in accordance with the present invention, the major strip may now be sliced at 60 into two or more narrower strips, which may for example be 12 inches wide, and the strip or strips are then cooled as on a cooling table which may be provide with cooling means such as a cooling fan 62 to accelerate the cooling process.

Longitudinal movement of the elements and assembled carpet strip may be approximately one to two feet per minute, and this permits an operator to remove the staples 14 or other fastening means retaining successive pieces in end-to-end relation.

The completed strips may now be handled as desired. They could, for example, be coiled onto take-up rolls (not shown), but for economy of manufacture, it is usually desirable to cut the strips transversely to form individual rectangular carpet tile. Thus, as seen at 70, there may be provided a rotatable knife having one or more blades 72 extending transversely of the carpet strips and rotated by conventional means (not shown) in timed relation with the strip movement to cut the strips into finished rectangular carpet units or tile 75, as seen in square form in FIG. 2.

In FIG. 4 there is shown, on a greatly enlarged scale, a fragmentary portion of a carpet tile 75 adhesively fixed to a concrete floor or other supporting surface indicated generally at 80. Thus a coating of adhesive 82 is applied to floor 80 as by brushing, and the tile is put in place. In order to enhance the breathing of the concrete floor the adhesive 82 should be pervious to passage of vapor therethrough. For example liquid neoprene adhesive may be modified by the addition of ammoniated carbonate for this purpose.

As seen in FIG. 4, woven fiberglass sheet 52 provides a multiplicity of minute pockets between the individual strands or threads of the sheet which, together with the permeable nature of the adhesive coating 82, insures that concrete 80 is permitted to breathe or sweat over its life.

Modifications and changes not substantially departing from the illustrative forms of the invention herein shown and described are intended to be embraced within the scope of the following claims.

I claim:

1. A method of making a carpet strip comprising:
   assembling in parallel slightly spaced side-by-side relation a plurality of narrow elongated flat-bottomed elements of rubbery base material having filamentary cords embedded therein, the upper ends of the cords projecting upwardly from the base to form a pile;

continuously coating the bottom surfaces of said assembled elements with an adhesive by forcing said bottoms into rolling pressure contact with a liquid adhesive coated surface; and rollingly pressing the coated bottoms onto a backing sheet to form a unitary carpet strip.

2. The invention as stated in claim 1 including the step, following said pressing, of slicing said strip longitudinally between selected elements to form a plurality of narrower strips.

3. Apparatus for making a continuous strip of carpeting of indefinite length, the carpeting consisting of a plurality of narrow elongated flat-bottomed elements including bases of rubbery material bonded to a backing sheet, the bases having cords embedded therein, upper portions of the cords projecting upwardly from the bases to form carpet pile, said apparatus comprising:

a source of a plurality of said narrow elongated elments;

means for collimating a plurality of the elements in side-by-side slightly spaced relation with their bottoms in horizontal alignment;

means for coating said aligned bottom with adhesive including a roller having a cylindrical surface, means for continuously supplying a liquid adhesive to said surface, and means for forcing the bottoms into rolling pressure contact with said surface; and means for bonding said coated bottoms to a backing sheet to form the carpeting strip.

References Cited

UNITED STATES PATENTS

| | | | |
|---|---|---|---|
| Re. 24,937 | 2/1961 | Lea | 156—94 |
| 1,844,838 | 2/1932 | Buffington | 156—178 |
| 3,002,868 | 10/1961 | Boivin. | |
| 3,037,898 | 6/1962 | Zumofen | 156—94 |

EARL M. BERGERT, *Primary Examiner.*

ALEXANDER WYMAN, *Examiner.*

D. H. ROBESON, D. SCHWARTZ, *Assistant Examiners.*